(12) United States Patent
Viswanathan

(10) Patent No.: US 11,263,245 B2
(45) Date of Patent: Mar. 1, 2022

(54) METHOD AND APPARATUS FOR CONTEXT BASED MAP DATA RETRIEVAL

(71) Applicant: HERE GLOBAL B.V., Eindhoven (NL)

(72) Inventor: Anirudh Viswanathan, Berkeley, CA (US)

(73) Assignee: HERE Global B.V., Eindhoven (NL)

( * ) Notice: Subject to any disclaimer, the term of this patent is extended or adjusted under 35 U.S.C. 154(b) by 233 days.

(21) Appl. No.: 16/175,394

(22) Filed: Oct. 30, 2018

(65) Prior Publication Data
US 2020/0134054 A1   Apr. 30, 2020

(51) Int. Cl.
| | | |
|---|---|---|
| G06F 16/20 | (2019.01) | |
| G06F 16/29 | (2019.01) | |
| G06N 3/08 | (2006.01) | |
| G06F 16/245 | (2019.01) | |

(52) U.S. Cl.
CPC ............ *G06F 16/29* (2019.01); *G06F 16/245* (2019.01); *G06N 3/08* (2013.01)

(58) Field of Classification Search
None
See application file for complete search history.

(56) References Cited

U.S. PATENT DOCUMENTS

| | | | |
|---|---|---|---|
| 9,536,004 B2 | 1/2017 | Flake et al. | |
| 10,060,751 B1 | 8/2018 | Chen et al. | |
| 2005/0216186 A1* | 9/2005 | Dorfman | G06F 16/29 |
| | | | 701/408 |
| 2006/0022846 A1* | 2/2006 | Tummala | G06F 16/29 |
| | | | 340/995.1 |
| 2008/0005068 A1 | 1/2008 | Dumais et al. | |
| 2013/0262107 A1* | 10/2013 | Bernard | G06F 16/40 |
| | | | 704/235 |
| 2014/0108307 A1 | 4/2014 | Raghunathan et al. | |
| 2015/0321665 A1* | 11/2015 | Pandita | B60W 50/14 |
| | | | 701/409 |
| 2016/0378861 A1* | 12/2016 | Eledath | G06K 9/00718 |
| | | | 707/766 |
| 2017/0276506 A1 | 9/2017 | McDunn et al. | |

(Continued)

FOREIGN PATENT DOCUMENTS

DE   202016001002 U1   5/2017

OTHER PUBLICATIONS

Office Action for related European Patent Application No. 19206237.0-1213, dated Feb. 27, 2020, 7 pages.

(Continued)

*Primary Examiner* — Jau Shya Meng
(74) *Attorney, Agent, or Firm* — Ditthavong, Steiner, Mlotkowski

(57) ABSTRACT

An approach is provided for storing and retrieving map data using contextual information priors. The approach involves, for example, processing contextual information to determine a restricted range of location information relevant to at least one query. The approach also involves processing sensor data received from at least one sensor, the sensor data collected at at least one query location, to determine semantic information. The approach further involves filtering the map data based, at least in part, on the restricted range of location information relevant to the at least one query, the semantic information, or a combination thereof.

20 Claims, 14 Drawing Sheets

(56) References Cited

U.S. PATENT DOCUMENTS

| | | | |
|---|---|---|---|
| 2017/0278402 A1* | 9/2017 | Yalla | G01C 21/3602 |
| 2017/0293610 A1* | 10/2017 | Tran | G06Q 10/025 |
| 2018/0164812 A1* | 6/2018 | Oh | G06N 3/02 |
| 2018/0189325 A1* | 7/2018 | Hohwald | G06N 3/0454 |
| 2018/0260956 A1* | 9/2018 | Huang | G06K 9/6271 |

OTHER PUBLICATIONS

Gopalan et al., "A Learning Approach Towards Detection and Tracking of Lane Markings," IEEE Transactions on Intelligent Transportation Systems, vol. 13, No. 3, Sep. 2012, pp. 1088-1098.
Office Action for related European Patent Application No. 19206237.0-1213, dated Feb. 16, 2021, 5 pages.

\* cited by examiner

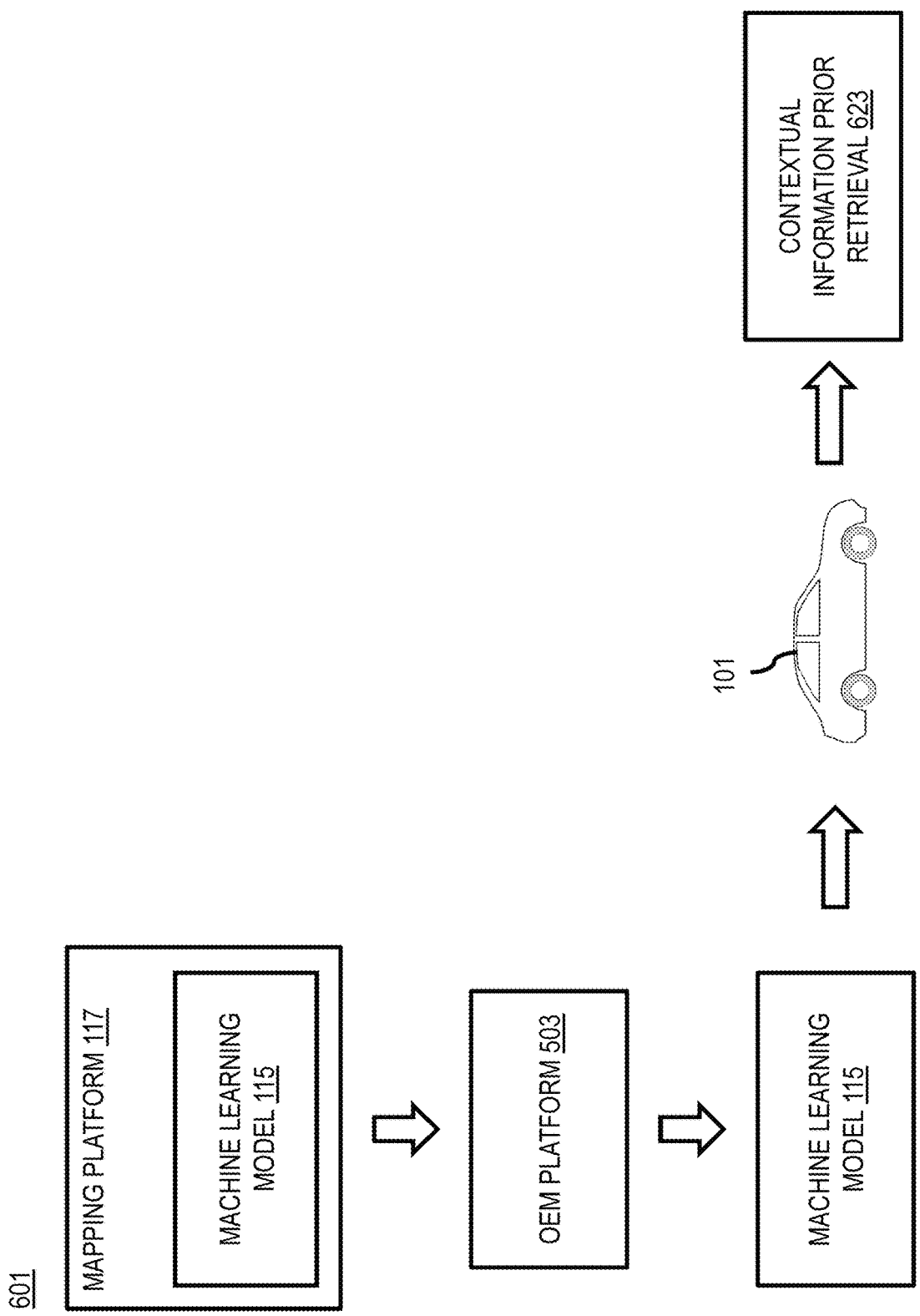

METHOD AND APPARATUS FOR CONTEXT BASED MAP DATA RETRIEVAL

BACKGROUND

Currently, map data storage is optimized using a tile-based scheme for efficient map data retrieval for location-based queries. However, retrieving a specific map data in the tile-based scheme can be inefficient because a single map tile may have more or less map data than is actually needed or desired is needed by a user. For example, a user may need only a small portion of a map tile, so that retrieving an entire tile could waste bandwidth, memory, and other related resources. Furthermore, a tree-based data structure that is implemented to store map data requires frequent rebalancing and rehashing to maintain efficient data retrieval. Therefore, service providers and manufacturers face significant technical challenges in characterizing and then accounting for contextual information for storing, organizing, and retrieving relevant map data.

Some Example Embodiments

Therefore, there is a need for an approach for storing and retrieving map data using contextual information priors.

According to one embodiment, a method for map data retrieval comprises processing contextual information to determine a restricted range of location information relevant to at least one query. The method also comprises processing sensor data received from at least one sensor, the sensor data collected at at least one query location, to determine semantic information. The method further comprises filtering the map data based, at least in part, on the restricted range of location information relevant to the at least one query, the semantic information, or a combination thereof.

According to another embodiment, an apparatus for map data retrieval, comprises at least one processor, and at least one memory including computer program code for one or more computer programs, the at least one memory and the computer program code configured to, with the at least one processor, cause, at least in part, the apparatus to process contextual information to determine a restricted range of location information relevant to at least one query. The apparatus is also caused to process sensor data received from at least one sensor, the sensor data collected at at least one query location, to determine semantic information. The apparatus is further caused to filter the map data based, at least in part, on the restricted range of location information relevant to the at least one query, the semantic information, or a combination thereof.

According to another embodiment, a non-transitory computer-readable storage medium for map data retrieval carries one or more sequences of one or more instructions which, when executed by one or more processors, cause, at least in part, an apparatus to process contextual information to determine a restricted range of location information relevant to at least one query. The apparatus is also caused to process sensor data received from at least one sensor, the sensor data collected at at least one query location, to determine semantic information. The apparatus is further caused to filter the map data based, at least in part, on the restricted range of location information relevant to the at least one query location, the semantic information, or a combination thereof.

According to another embodiment, an apparatus for map data retrieval comprises means for processing contextual information to determine a restricted range of location information relevant to at least one query. The apparatus also comprises means for processing sensor data received from at least one sensor, the sensor data collected at at least one query location, to determine semantic information. The apparatus further comprises means for filtering the map data based, at least in part, on the restricted range of location information relevant to the at least one query, the semantic information, or a combination thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 5 and 6 are diagrams illustrating examples of deploying a machine learning model to a vehicle to store and retrieve map data using contextual information priors, according to one embodiment;

DESCRIPTION OF SOME EMBODIMENTS

Examples of a method, apparatus, and computer program for storing and retrieving map data using contextual information priors, are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
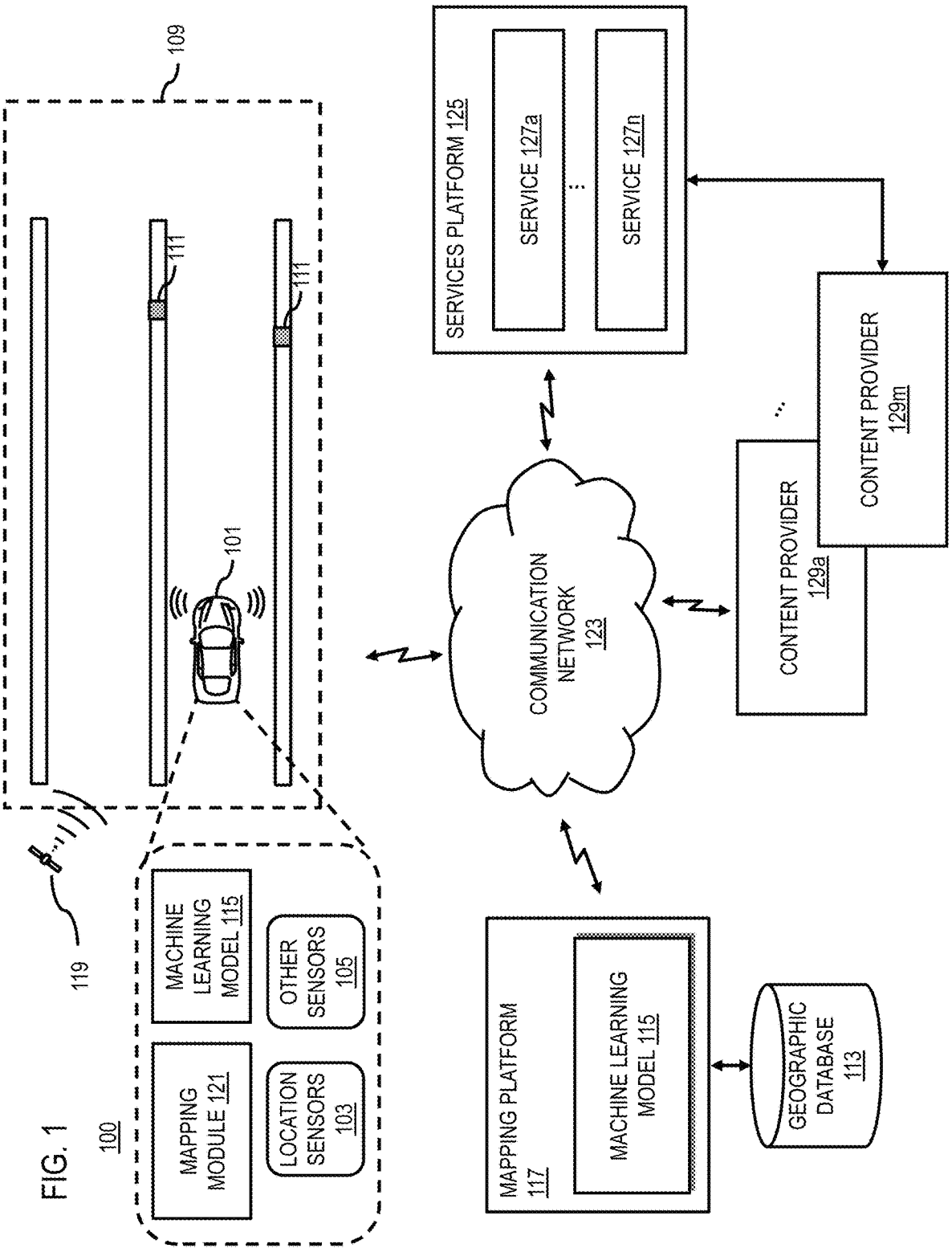
FIG. 1 is a diagram of a system capable of storing and retrieving map data using contextual information priors, according to one example embodiment.

FIG. 1 is a diagram of a system capable of storing and retrieving map data using contextual information priors, according to one embodiment. Conventionally storage of voluminous map data is optimized by using a tile-based scheme for efficient retrieval and is stored in a database. In the tile-based scheme, original map data is divided into a plurality of map tiles, e.g., in the form of a grid, and only transmits map tiles selected from the original map data, such that, the receiving client generates the original map data by combining the received map tiles. In one example embodiment, the client can receive a map service without transmitting large original map data as only map tiles corresponding to the current location of the user or the point where the user wishes to move are selected from the original entire map data and transmitted. However, in the tile-based scheme, numerous tile map data are individually generated from the original map data, thus resulting in voluminous map data itself. Moreover, numerous tile map data are transmitted pursuant to a request for a specific map data that corresponds to a map area, which is inefficient. Furthermore, a tree-based data structure, e.g., ked-tree, b-tree, or r-tree, is used to store voluminous map data for efficient spatial search. However, the tree-based data structure requires frequent rebalancing, e.g., by adding new data, and subsequent rehashing to maintain efficient data retrieval since contextual information is not taken into consideration during data retrieval.

To address this problem, system 100 of FIG. 1 introduces the capability to store and retrieve map data using contextual information priors. In one embodiment, system 100 processes contextual information to determine a restricted range of location information relevant to a query. Subsequently, system 100 processes sensor data received from at least one sensor at a specific query location to determine semantic information. Thereafter, system 100 filters the map data based, at least in part, on the restricted range of location information relevant to the query and/or semantic information. Contextual information makes retrieval of map data more efficient and speeds-up the data retrieval process. Furthermore, there is no requirement to rebalance the data structure, since neural network weights encode the retrieval scheme, and the contextual information implicitly acts as a load balancer, i.e., to constrain the number of retrieved items. In addition, usage of contextual information potentially improves the localizer performance for a vehicle, since environment features that fall outside of the contextual window are discarded and cannot bias the algorithm. In one example embodiment, a user may request location-based queries, e.g., search for nearby cafes, or an autonomous vehicle may query for an all lane lines and signs that occur in proximity to the vehicle location. Then, system 100 may perform a location-based search by using user location to seed a local search within a specified region on the map. Thereafter, system 100 may retrieve map data which contains location information as relevant to the user query. Subsequently, system 100 maps data-storage and retrieval using contextual information priors. Specifically, a neural network is used to predict a restricted range of location information that is contextually relevant to a query location. Therefore, the neural network is provided with sensor data that comprises an environment, or a pose path of inferred sensor data, and a query point, to return hits that are relevant to locations on a map.

Vehicle 101 is any vehicles, e.g., an autonomous vehicle, equipped with a variety of sensors including but not limited to location sensors 103, e.g., configured to process signals from positioning satellites 119, e.g., a Global Positioning System (GPS) satellite, and other sensors 105, e.g., camera sensor, LiDAR sensor, RADAR sensor, etc., to assist in correctly localizing vehicle 101 on a map 109. In one embodiment, accurate determination of vehicle 101's location on the map enables planning of a route, both on fine and coarse scales. On a coarse scale, navigation maps (e.g., a digital map provided from a geographic database 113) allow vehicles 101 to know what roads to use to reach a particular destination. However, on a finer scale, digital maps allow vehicles 101 to know what lanes to be in and when to make lane changes (e.g., lane-level localization). Knowing this information is important for determining contextually relevant map data, e.g., signs 111 visible and accessible from the lanes being traveled.

In one embodiment, mapping platform 117 may be a platform with multiple interconnected components and may include multiple servers, intelligent networking devices, computing devices, components and corresponding software for storing and retrieving map data using contextual information priors. In addition, it is noted that mapping platform 117 may be a separate entity of system 100, a part of one or more services 127, a part of services platform 125, or included within vehicle 101 (e.g., as a mapping module 121).

In one embodiment, mapping platform 117 trains a plurality of neural network for map data retrieval wherein the contextual information is used to train the storage and retrieval scheme. The plurality of neural network is provided with sensor data of an environment (or a pose path of inferred sensor data) and a query point to obtain relevant locations on a map. Thereafter, a restricted range of location information that is contextually relevant to a query location is determined. Contextual information used in the retrieval step is performed using semantic segmentation on sensor input, e.g., camera images, LiDAR data, and other relevant data. The semantic information identifies regions in the sensor data that correspond to road signs, lane lines, drivable surface, and other relevant data. Additionally, a vehicle pose path provides a geometric context for a driving direction for next few timesteps, e.g., if a vehicle has been driving along a long straight road, it is likely to continue doing so, unless the semantic segmentation indicates a fork in the road.

In another embodiment, during training of neural network, mapping platform 117 obtains contextual information by using semantic segmentation on vehicle sensor input data, e.g. camera images or LIDAR data, and vehicle pose path is used for geometric context for driving direction of the vehicle.

Thereafter, at deployment, given a new sensor input and a query location, mapping platform 117 regresses a range of possible location-data points as relevant to the query. During deployment, for a new input data stream, the semantic segmentation is applied to incoming sensor data and a query location. The output of the network is contextually filtered location data. In one embodiment, a training data set is built using the semantic information to filter out irrelevant map data that falls outside the context specified by the semantics. For example, signs on adjacent roads that are not visible are removed from the set of retrieved location-data items. In another embodiment, the training dataset contains semantic information with pose query and unfiltered map data, and corresponding filtered map data. Mapping platform 117 trains a plurality of neural networks to regress query locations on the map to maximize the separation between unfiltered and filtered map data. In one embodiment, the architecture of the neural network is in the form of a standard autoencoder.

In one embodiment, trained machine learning model 115 can be deployed on the server side in mapping platform 117 and/or locally at vehicle 101 in a mapping module 121 over a communication network 123. Accordingly, within system 100, mapping platform 117 and/or mapping module 121 can perform the functions related to storing and retrieving map data using contextual information priors using machine learning. In one embodiment, mapping platform 117 and/or mapping module 121 includes one or more components for storing and retrieving map data using contextual information priors according to various embodiments described herein. It is contemplated that the functions of these components may be combined or performed by other components of equivalent functionality. Though depicted as separate entities in FIG. 1, it is contemplated that mapping platform 117 and/or mapping module 121 may be implemented as a module of any of the components of system 100 (e.g., vehicle 101, services platform 125, any of services 127a-127m of services platform 125, etc.).

In one embodiment, communication network 123 of system 100 includes one or more networks such as a data network, a wireless network, a telephony network, or any combination thereof. It is contemplated that the data network may be any local area network (LAN), metropolitan area network (MAN), wide area network (WAN), a public data network, e.g., the Internet, short-range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, mapping platform 117 has connectivity over a communication network 123 to services platform 125, e.g., an OEM platform, that provides one or more services 127, e.g., sensor data collection services. By way of example, services 127 may also be other third-party services and include mapping services, navigation services, travel planning services, notification services, social networking services, content, e.g., audio, video, images, etc., provisioning services, application services, storage services, contextual information determination services, semantic information determination services, location-based services, information-based services, e.g., weather, news, etc. In one embodiment, services platform 125 uses the output, e.g. contextual information priors, of machine learning model 115 to provide services such as navigation, mapping, other location-based services, etc.

In one embodiment, content providers 129a-129m (collectively referred to as content providers 129) may provide content or data, e.g., including contextual information, semantic information, geographic data, sensor data, etc., to geographic database 113, mapping platform 117, services platform 125, services 127, and vehicle 101. The content provided may be any type of content, such as map content, textual content, audio content, video content, image content, etc. In one embodiment, content providers 129 may provide content that may aid in storing and retrieving map data using contextual information priors. In one embodiment, content providers 129 may also store content associated with geographic database 113, mapping platform 117, services platform 125, services 127, and/or vehicle 101. In another embodiment, content providers 129 may manage access to a central repository of data and offer a consistent, standard interface to data, such as a repository of the geographic database 113.

By way of example, mapping platform 117, services platform 125, services 127, vehicle 101, and/or content providers 129 communicate with each other and other components of system 100 using well known, new or still developing protocols. In this context, a protocol includes a set of rules defining how the network nodes within the communication network 123 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
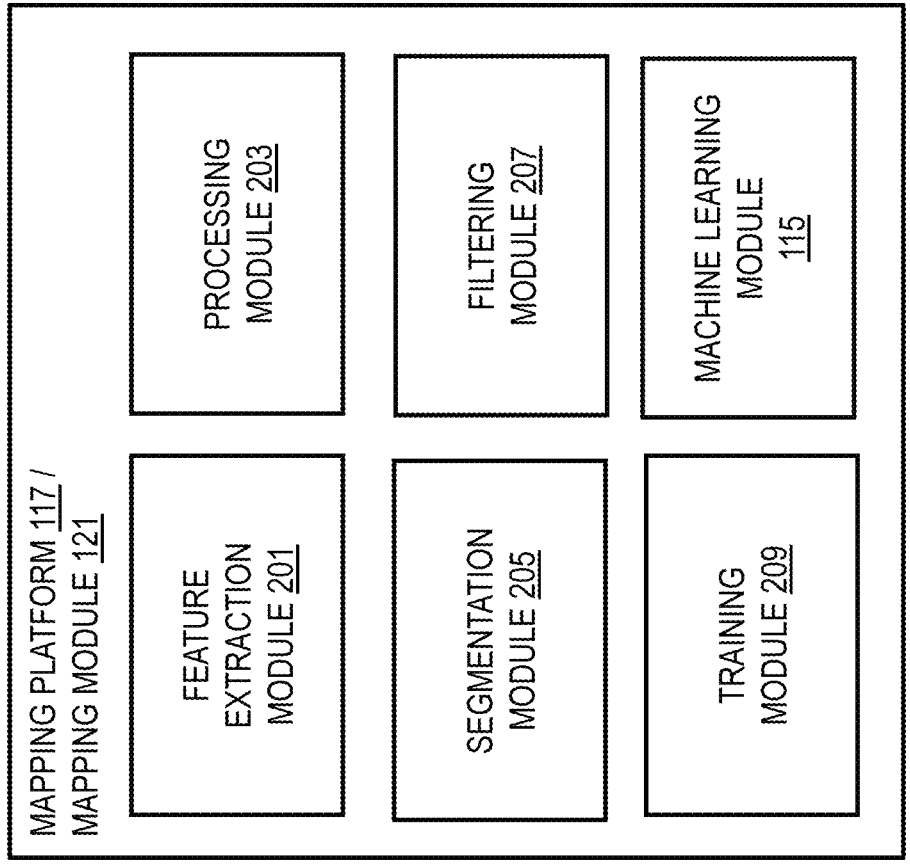
FIG. 2 is a diagram of components of mapping platform 117 and/or mapping module 121, according to one embodiment.

FIG. 2 is a diagram of the components of mapping platform 117 and/or mapping module 121, according to one embodiment. By way of example, mapping platform 117 and/or mapping module 121 includes one or more components for providing contextually relevant map data. It is contemplated that the functions of these components may be combined in one or more components or performed by other components of equivalent functionality. In this embodiment, mapping platform 117 and/or mapping module 121 includes a feature extraction module 201, processing module 203, segmentation module 205, filtering module 207, training module 209, and machine learning model 115. It is contemplated that the functions of these components may be combined in one or more components or performed by other components of equivalent functionality. Though depicted as separate entities in FIG. 1, it is contemplated that mapping platform 117 and/or mapping module 121 may be implemented as a module of any of the components of system 100 (e.g., vehicle 101, services platform 125, any of services 127a-127m of services platform 125, etc.). In another embodiment, one or more of modules 201-209 and/or machine learning model 115 may be implemented as a cloud-based service, local service, native application, or combination thereof. The functions of mapping platform 117 and/or mapping module 121 are discussed with respect to FIGS. 2-9 below.

In one embodiment, feature extraction module 201 collects contextual information and semantic information for a geographic region, wherein the contextual information and the semantic information comprises a set of training features extracted from sensor data, map data, or a combination thereof. More specifically, in one embodiment, for collection of training data, mapping platform 117 and/or mapping module 121 leverages resources such as but not limited to previously generated digital map data, e.g., high definition (HD) map data stored in geographic database 113, as well as probe or trajectory data collected from vehicles 101 that have traversed the geographic areas of interest, e.g., dense urban regions, hilly regions, etc. Accordingly, in one embodiment, feature extraction module 201 can query geographic database 113 for map data corresponding to the respective location of the probe points in the training dataset. The map data then represents yet another data stream. In yet another embodiment, other types of data can also be included in the training dataset such as but not limited to weather data, sensor type, sensor manufacturer, vehicle characteristics, etc. After compiling the data streams into the training dataset, in one embodiment, the feature extraction module 201 can determine or retrieve relevant features (e.g., characteristics, attributes, properties, etc.) of the compiled training data. As used herein, relevant refers to any feature that has an effect or correlation with sensor error with respect to the target sensor. For example, when the target sensor is a location or GPS sensor, features indicating the presence of structures or objects capable of blocking a view of lane markings or road signs can potentially be relevant. Feature extraction module 201, for instance, can process image data and/or structure data to determine the presence of road signs, lane markings, buildings, structures, terrain features, drivable surfaces, etc. The characteristics of any detected structures, road signs, lane markings, or buildings can be a feature extracted for training the machine learning model 115. Similar data on structures can be extracted from other data streams such as the digital map data by identifying where the map data indicates the presence of any road signs, lane markings, structures, buildings, terrain, etc., within a threshold distance of the probe point location. For example, the digital map data can include three-dimensional (3D) models of nearby structures, road signs, lane markings, terrain features, drivable surfaces or buildings, that can be used as input features for training the machine learning model 115. It is noted that the example features discussed above are provided by way of illustration and not as limitations.

In one embodiment, processing module 203 processes contextual information to determine a restricted range of location information relevant to at least one query. In another embodiment, processing module 203 processing sensor data received from location sensors 103 and other sensors 105 at a query location to determine semantic information. In a further embodiment, processing module 203 processes vehicle position and/or heading data received from location sensors 103 and other sensors 105 to determine a geometric context for a driving direction of the vehicle.

In one embodiment, segmentation module 205 receives processed data from processing module 203, and performs semantic segmentation of the sensor data to identify relevant regions in the sensor data. Thereafter, segmentation module 205 segments one or more relevant regions in the sensor data to determine relevant semantic information within the relevant region. In another embodiment, segmentation module 205 may determine a geometric context for a driving direction of a vehicle based, at least in part, on semantic segmentation. For example. a driving direction for a vehicle driving along a straight lane is likely to remain unchanged unless semantic segmentation indicates a fork, e.g., T junction, Y junction, etc., in the road.

In one embodiment, filtering module 207 filters map data and sensor data based, at least in part, on restricted range of location information relevant to a query, semantic information, geometric context for a driving direction of the at least one vehicle, or a combination thereof to store and retrieve map data using contextual information priors or to filter-out irrelevant map data that falls outside the context specified by the semantics. In one example embodiment, lane markings and road signs on adjacent roads that are not visible, e.g., occluded by buildings or due to extreme weather conditions, are filtered out from the set of retrieved location-data items. In another embodiment, filtering module 207 and training module 209 trains a neural network to regress query locations on a map to maximize separation between unfiltered and filtered data.

In one embodiment, training module 209 trains machine learning model 115, e.g., a neural network, support vector machine, or equivalent, by obtaining a feature vector or matrix comprising the selected training features from the feature extraction module 201. During the training process, training module 209 feeds the feature vectors or matrices of the training dataset into machine learning model 115 to compute a contextually relevant map data. In one example embodiment, training module 209 trains machine learning model 115 to a learning-based approach to map data-storage and retrieval using contextual information priors and semantic information priors. Specifically, machine learning model 115 is trained to predict a restricted range of location information that is contextually relevant to the query location. In order to do so, machine learning model 115 is provided with sensor data that comprises an environment, a pose path of inferred sensor data, and a query point, to return hits/relevant to locations on a map.

Figure 3A:
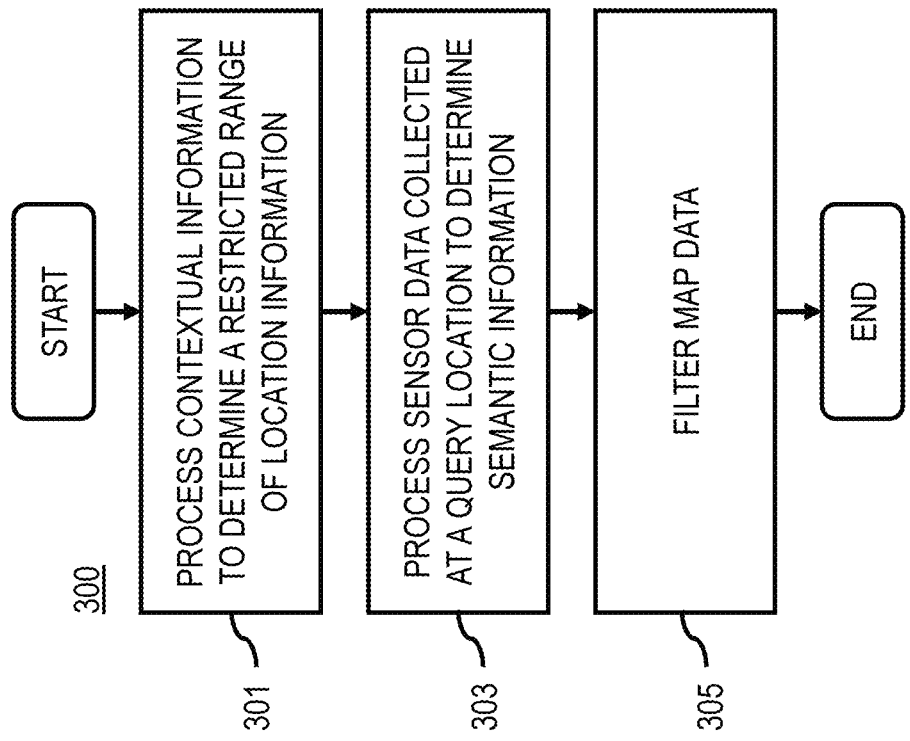
FIG. 3A is a flowchart of a process for training a machine learning model to store and retrieve map data using contextual information priors, according to one example embodiment.
Figure 12:
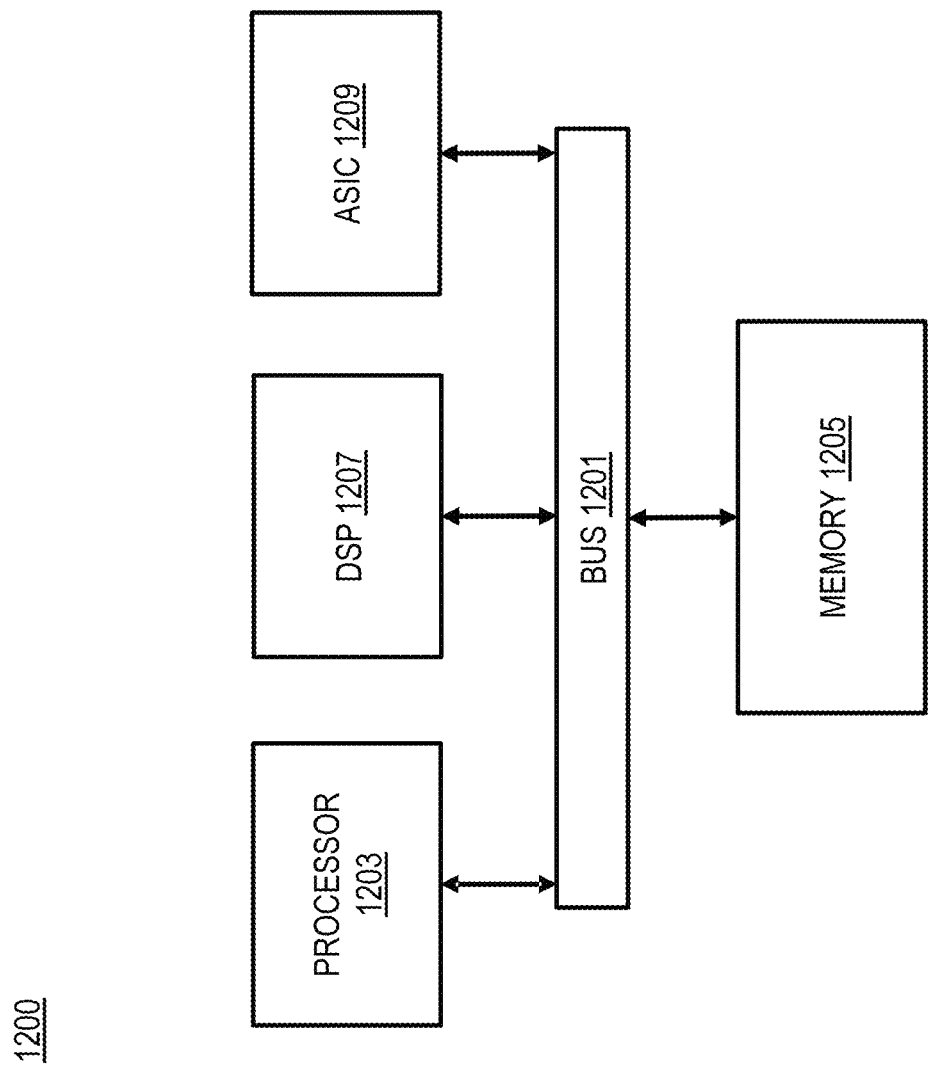
FIG. 12 illustrates a chip set 1200 upon which an embodiment of the invention may be implemented.

FIG. 3A is a flowchart of a process for training a machine learning model to store and retrieve map data using contextual information priors, according to one example embodiment. In various embodiments, mapping platform 117 and/or mapping module 121, e.g., alone or in combination, may perform one or more portions of process 300 and may be implemented in, for instance, a chip set including a processor and a memory as shown in FIG. 12. As such, mapping platform 117, mapping module 121, and/or any of their component modules can provide means for accomplishing various parts of process 300, as well as means for accomplishing embodiments of other processes described herein in conjunction with other components of system 100. In addition, embodiments describing functions/actions related to either of mapping platform 117 or mapping module 121 individually is equally applicable to the other. Although process 300 is illustrated and described as a sequence of steps, its contemplated that various embodiments of process 300 may be performed in any order or combination and need not include all of the illustrated steps.

In step 301, mapping platform 117 and/or mapping module 121 processes contextual information to determine a restricted range of location information relevant to a query. In one embodiment, the contextual information comprises sensor information, temporal information, vehicle position information, seasonal information, temperature information, or other features relevant to the specific location query. In one example embodiment, mapping platform 117 and/or mapping module 121 may query for map data within a certain radius, i.e., restricted range of location information relevant to the query. The data retrieved should be within the fixed radius and should exhibit contextual behavior relevant the query.

In step 303, mapping platform 117 and/or mapping module 121 determines semantic information by processing sensor data collected by one or more sensors at a query location. In one embodiment, the sensor data comprises visual data, aural data, light detection and ranging (LIDAR) data, or other data relevant to the specific location. In another embodiment, the semantic information comprises one or more road signs, one or more lane lines, terrain features, drivable surfaces, or other features relevant to the specific location query. Then, mapping platform 117 and/or mapping module 121 performs semantic segmentation of the sensor data to identify and segment one or more relevant regions in the sensor data. Subsequently, mapping platform 117 and/or mapping module 121 determines semantic information related to the relevant regions in the sensor data.

Figure 3B:
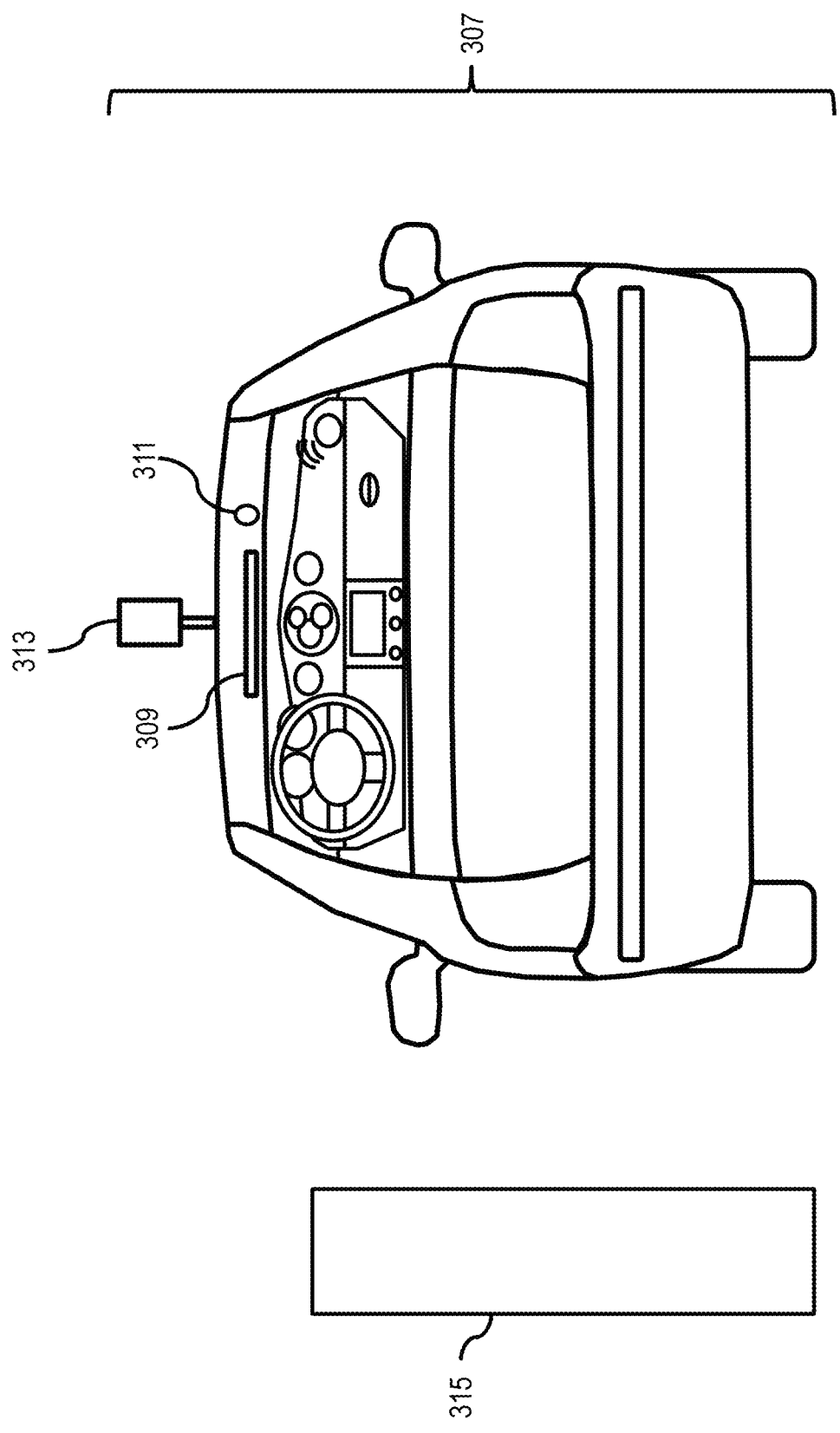
FIG. 3B is a diagram of a vehicle equipped with plurality of sensors to support the collection of training data for machine learning of storing and retrieving map data using contextual information priors, according to one embodiment.

As illustrated in FIG. 3B, a vehicle 307 is equipped with a plurality of sensors to support the collection of training data for machine learning of contextually relevant map data, according to one embodiment. As shown, vehicle 307 is equipped with a location sensor 309, e.g., a GPS receiver, and other sensors such as but not limited to a camera sensor 311 and LiDAR sensor 313. As vehicle 307 travels in an area being surveyed, vehicle 307 can initiate the capture of location data from location sensor 309, image data from camera sensor 311, and three-dimensional mesh data from LiDAR sensor 313. As these vehicles drive and collect contextual information, semantic information, or sensor data in the geographic areas of interest, the contextual information, semantic information, or sensor data can be collected by feature extraction module 201 of mapping platform 117 and/or mapping module 121 to use as training data.

In one embodiment, raw sensor data is first collected. Then, for each drive in the region or area of interest, feature extraction module 201 can run the compute-intensive localizer, for instance, a grid-like pattern for each vehicle pose point to identify the corrected vehicle pose. In one embodiment, the computing resources needed by the compute-intensive localizer can vary with the grid-size, e.g., smaller grid sizes with more grid cells require more compute resources. Accordingly, the grid-size can be specified based on the available computing resources. By searching and computing offsets in this pattern, feature extraction module 201 can identify or select the grid location associated with the highest probability of being the true location of the collection of the vehicle.

In one embodiment, the training dataset can include streams from other data sources such as digital map data, e.g., HD maps of geographic database 113. For example, with respect to location sensors, the structural features, e.g., road signs or structures 315, or terrain can have a potential correlation with contextually relevant map data, e.g., structures obstructing the view of road signs on adjacent roads. Accordingly, in one embodiment, feature extraction module 201 can query geographic database 113 for map data corresponding to the respective location of the probe points in the training dataset. The map data then represents yet another data stream. In yet another embodiment, other types of data can also be included the training dataset such as but not limited to weather data, sensor type, sensor manufacturer, vehicle characteristics, etc.

In one embodiment, after compiling the data streams into the training dataset, feature extraction module 201 can determine or retrieve relevant features, e.g., characteristics, attributes, properties, etc., of the compiled training data. As used herein, relevant refers to any feature that has an effect or correlation with contextually relevant map data. For example, when the target sensor is a location or GPS sensor, features indicating the presence of structures capable of causing interference with road signs can potentially be relevant. The feature extraction module 201, for instance, can process image data and/or structure data to determine the presence of lane markings, intersections, road signs, buildings, structures, terrain, etc. The characteristics of any detected lane markings, intersections, road signs, buildings, or structures can be a feature extracted for training machine learning model 115. Similar data on structures can be extracted from other data streams such as the digital map data by identifying where the map data indicates the presence of any lane markings, intersections, road signs, buildings, structures, terrain, etc. within a threshold distance of the probe point location. For example, the digital map data can include three-dimensional (3D) models of nearby lane markings, intersections, road signs, buildings, structures, terrain, etc., that can be used as input features for training the machine learning model 115. It is noted that the example features discussed above are provided by way of illustration and not as limitations.

In one embodiment, the feature extraction process also comprises converting the feature data into a format suitable for input into machine learning model 115. For example, the features or data items can be converted into an input vector or matrix for training the by machine learning model 115. Other examples of feature conversion can include but is not limited to: converting a text label to a Boolean flag; converting text labels to categorical labels; converting dates/times to a standardized format; normalizing or converting the extracted feature data into a common taxonomy or dictionary of terms; etc.

As illustrated above, the training data may include any number of features or characteristics the raw sensor data and related information. However, some of the features may not correlate well or at all with storing and retrieving map data using contextual information priors. Including such features in training data, therefore, would not increase or contribute to the predictive power of the machine learning model 115. Accordingly, in one embodiment, feature extraction module 201 can further process the training data to extract or select one or more training features. In one embodiment, feature extraction module 201 can use any statistical method known in the art, e.g., Principal Component Analysis (PCA) and Univariate Selection, to select the best-correlated features to predict or classify the contextually relevant map data. In other words, feature extraction module 201 extracts the training features from the training data by first determining a set of candidate features. Mapping platform 117 and/or mapping module 121 then selects the training features from among the set of candidate features based on a calculated correlation of the candidate features to determine contextually relevant map data.

In step 305, mapping platform 117 and/or mapping module 121 filters map data based, at least in part, on the restricted range of location information relevant to a query, the semantic information, or a combination thereof. In another embodiment, mapping platform 117 and/or mapping module 121 filters map data based, at least in part, on geometric context for a driving direction of a vehicle. In one embodiment, a plurality of neural networks regresses a query location on a mapping platform to separate unfiltered and filtered map data.

Figure 4:
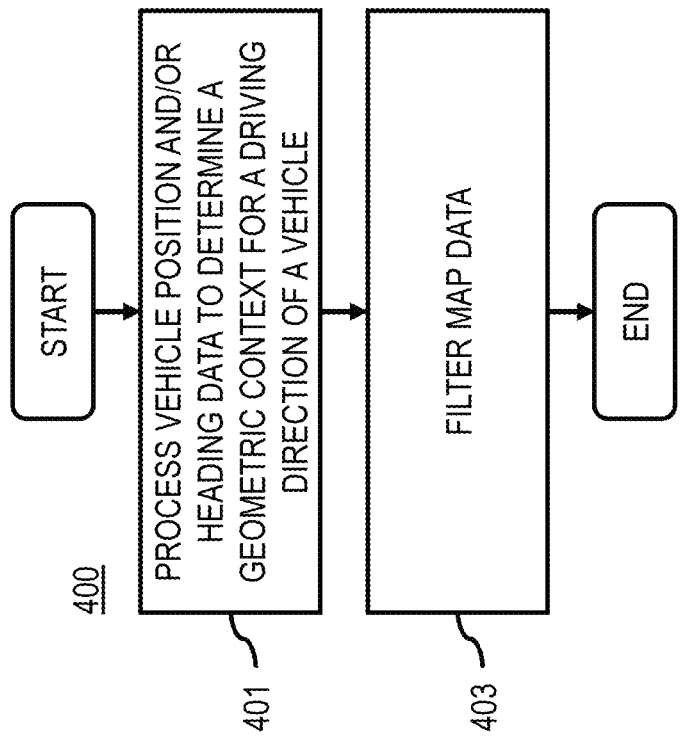
FIG. 4 is a flowchart of a process for training a machine learning model to store and retrieve map data using contextual information priors based on vehicle position and/or heading data, according to one example embodiment.

FIG. 4 is a flowchart of a process for training a machine learning model to store and retrieve map data using contextual information priors based on vehicle position and/or heading data, according to one example embodiment. In various embodiments, mapping platform 117 and/or mapping module 121, e.g., alone or in combination, may perform one or more portions of process 400 and may be implemented in, for instance, a chip set including a processor and a memory as shown in FIG. 12. As such, mapping platform 117, mapping module 121, and/or any of their component modules can provide means for accomplishing various parts of process 400, as well as means for accomplishing embodiments of other processes described herein in conjunction with other components of system 100. In addition, embodiments describing functions/actions related to either of mapping platform 117 or mapping module 121 individually is equally applicable to the other. Although process 400 is illustrated and described as a sequence of steps, its contemplated that various embodiments of process 400 may be performed in any order or combination and need not include all of the illustrated steps.

In step 401, mapping platform 117 and/or mapping module 121 processes vehicle position and/or heading data received from one or more sensors to determine the geometric context for a driving direction of a vehicle. In another embodiment, mapping platform 117 and/or mapping module 121 determines the geometric context for a driving direction of the vehicle based, at least in part, on semantic segmentation. In one example embodiment, driving direction for a vehicle traversing a straight road is unlikely to change unless mapping platform 117 and/or mapping module 121 performing semantic segmentation predicts an oncoming intersection, e.g., T junction, Y junction, etc., ahead in the straight road. The upcoming intersection is likely to change the direction of the vehicle, thereby changing the range of location information relevant to the vehicle, contextual information, and/or semantic information.

In step 403, mapping platform 117 and/or mapping module 121 filters map data based, at least in part, on geometric context for a driving direction of a vehicle. In one embodiment, contextually relevant map data may be further filtered based on the driving direction of the vehicle. In one example embodiment, one or more visible signs may be further filtered to include only those signs that correspond to the driving direction of the vehicle. In such manner signs, e.g., road signs for gasoline stations, auto repair shops, stores, etc., that are visible as well as accessible is included.

Figure 5:
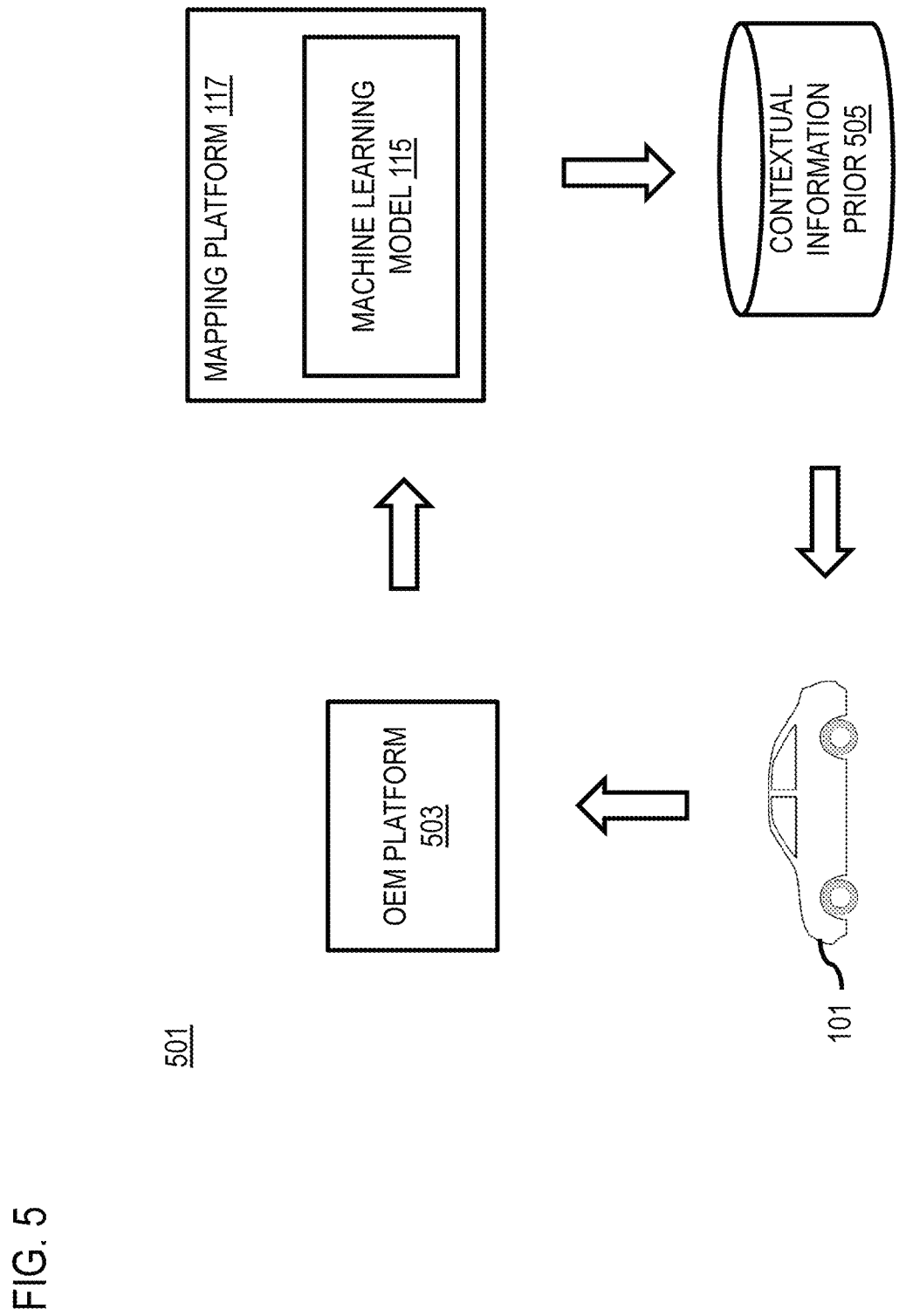

FIGS. 5 and 6 are diagrams illustrating examples of deploying a machine learning model to a vehicle to store and retrieve map data using contextual information priors, according to one embodiment. FIG. 5 illustrates an example architecture 501 in which the machine learning model 115 is instantiated on a network component, e.g., mapping platform 117. In this way, the processing needed by the machine learning model 115 is provided on the server side, where computing resources, e.g., processing power, memory, storage, etc., is generally greater than at a local component, e.g., vehicle 101.

Under architecture 501, an OEM platform 503, e.g., operated by an automobile manufacturer, collects contextual information, semantic information, and sensor data as a vehicle travels in a road network. OEM platform 503 sends the collected contextual information, semantic information, and sensor data to mapping platform 117, e.g., typically operated by a map or other service provider, for ingestion and processing. Mapping platform 117, e.g., where the trained machine learning model 115 is instantiated, then processes the received contextual information, semantic information, and sensor data using machine learning model 115 to store and retrieve map data using contextual information priors according to the embodiments described herein. In one embodiment, the retrieved contextually relevant map data can then be fused with map attribute information to produce a data layer of relevant map data 705 that correlates contextually relevant map data to locations in the digital map (e.g., HD map of geographic database 113). The mapping platform 117 can then publish contextual information prior 505 for delivery to vehicle 101 either directly or through OEM platform 503.

FIG. 6 illustrates an alternative architecture 601 in which contextually relevant map data are not delivered to vehicle 101. Instead, trained machine learning model 115 is instantiated at a local component or system of a vehicle 101, e.g., mapping module 121, traveling on a road network. In this way, the local component uses machine learning model 115 to store and retrieve map data using contextual information priors (e.g., contextual information prior retrieval 623) based on locally collected contextual information and sensor data. In one use case, the local retrieval of contextually relevant map data is used to localize a vehicle while operating in an autonomous driving mode.

As shown, to enable this architecture 601, mapping platform 117 trains machine learning model 115 as previously described. Mapping platform 117 can then deliver trained machine learning model 115 to vehicle 101 either directly or through OEM platform 503. A local system or component of vehicle 101 then executes an instance of trained machine learning model 115 to store and retrieve map data using contextual information priors locally at vehicle 101. In this way, the vehicle is able to store and retrieve map data using contextual information priors for road segments on which it is traveling when the vehicle does not have communications to network-side components such as mapping platform 117 as it travels, e.g., mountainous terrain feature may block or obstruct the wireless signal, thereby delaying the process of the service. In one embodiment, as new training data is collected, an updated trained machine learning model 115 can be delivered to vehicle 101 as needed, periodically, etc.

Figure 7B:
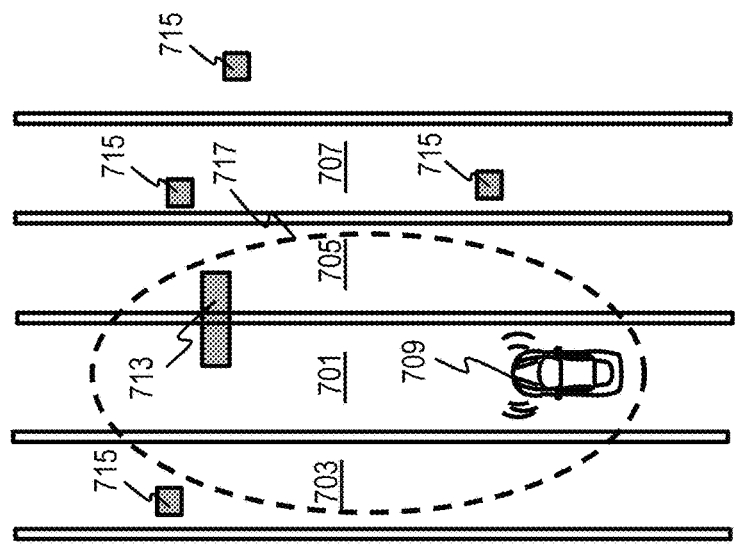
FIGS. 7A-B are diagrams that represent a scenario wherein contextually relevant map data is retrieved for a location-based query, according to one example embodiment.
Figure 7A:
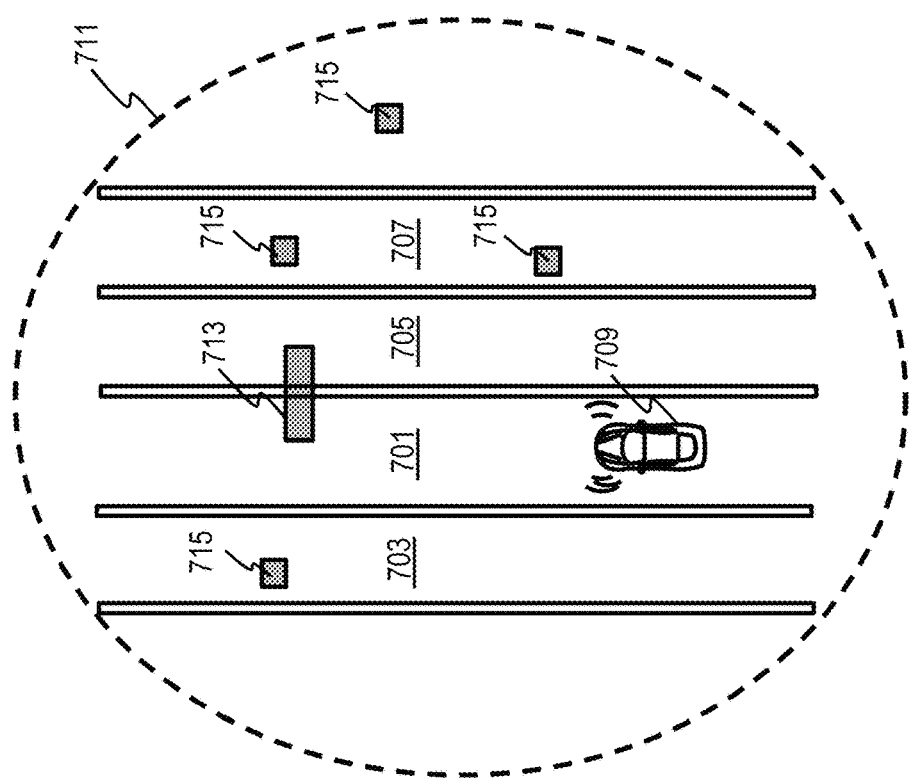

FIGS. 7A-B are diagrams that represent a scenario wherein contextually relevant map data is retrieved for a location-based query, according to one example embodiment. As illustrated in FIG. 7A, road 701 is a straight road without an interchange to adjacent roads 703, 705, and 707. The lane markings and signs on adjacent roads 703, 705, and 707 are irrelevant for vehicle 709 traveling on road 701 because adjacent roads 703, 705, and 707 are inaccessible. Despite this, during a data retrieval process, irrelevant location information is returned as positive hits. In one example embodiment, search range 711 includes sign 713 on road 701 as well as signs 715 on adjacent roads 703 and 707 as positive hits. Sign 713 is visible to vehicle 709 and is relevant, however, signs 715 are neither accessible nor visible to vehicle 709, and is irrelevant. Adverting to FIG. 7B, vehicle 709, e.g., vehicle pose/query point, may query for an all lane lines and road signs that occur in proximity to the vehicle location. Then, system 100 performs a location-based search by using vehicle location to seed a local search within a specified region on the map. System 100 determines a restricted search range 717 for vehicle 709 based, at least in part, on contextual information, semantic information, or a combination thereof. In this example embodiment, restricted search range 717 includes only relevant information, e.g., signs 713, i.e., all signs within restricted search range 717, on lane 701 that is visible to vehicle 709. In one embodiment, only features that pass the contextual test are retrieved by the algorithm. System 100 removes irrelevant information, e.g., signs 715 on adjacent lanes that are neither visible nor accessible to vehicle 709, from a set of retrieved location-data items.

Figure 8:
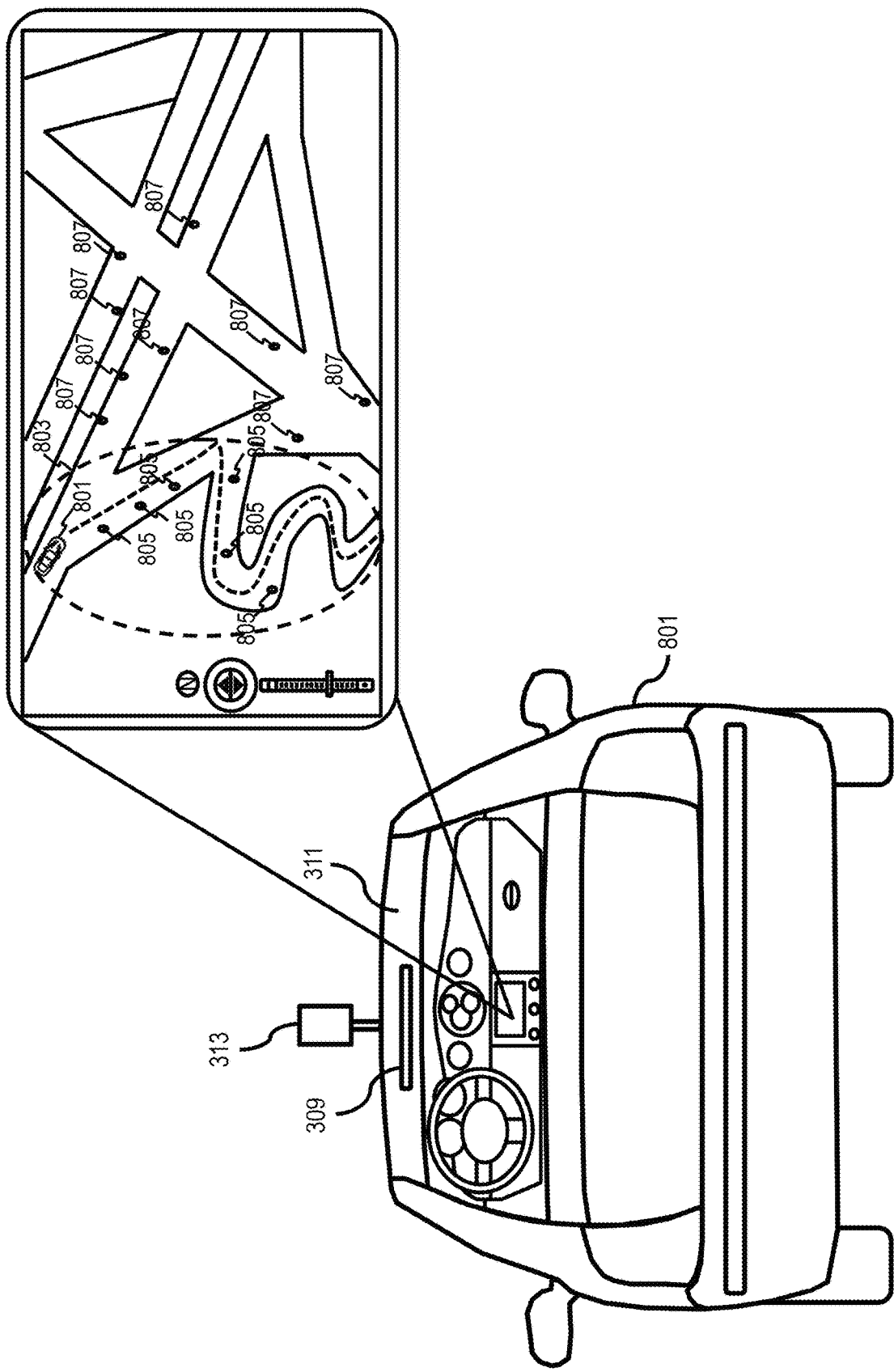
FIG. 8 is a user interface diagram that represents a scenario wherein contextually relevant map data is retrieved for at least one vehicle traveling in a predetermined route towards at least one destination, according to one example embodiment.

FIG. 8 is a user interface diagram that represents a scenario wherein contextually relevant map data is retrieved for at least one vehicle traveling in a predetermined route towards at least one destination, according to one example embodiment. Autonomous driving has quickly become an area of interest for vehicle manufacturers and navigation/mapping service providers. However, autonomous navigation is challenging for various reasons: (a) appearance of lane markings and road signs; (b) the type of road in which the vehicle is traveling; (c) objects that block the lane markings and road signs; (d) weather conditions and/or time of day in which the query location needs to be analyzed, and so on. Thus, active sensing and continuous processing of map data and/or sensor data is required to improve the autonomous vehicle's ability to learn about its environment and/or perform self-diagnosis. As depicted in FIG. 8, vehicle 801 is traveling to a particular destination by following a route recommended by a mapping application in vehicle 801. Subsequently, system 100 collects contextual information, e.g., navigation information, location information, vehicle position information, etc., from sensors 103 and other sensors 105. Thereafter, system 100 processes the contextual information to determine a restricted search range 803 comprising relevant map data. Then, system 100 determines semantic information by processing sensor data received from sensors 103 and other sensors 105 collected at a query location. In one embodiment, the semantic information comprises road signs (e.g., signs for gasoline stations, hotels, restaurants, automobile dealerships, auto repair shops, buildings, stores, parks, etc.), lane markings, terrain features and/or drivable surfaces, relevant to the query location. Consequently, system 100 filters map data based, at least in part, on restricted search range 803 and/or semantic information. Accordingly, system 100 provides vehicle 801 with contextually relevant map data 805 and excludes irrelevant map data 807.

Figure 9:
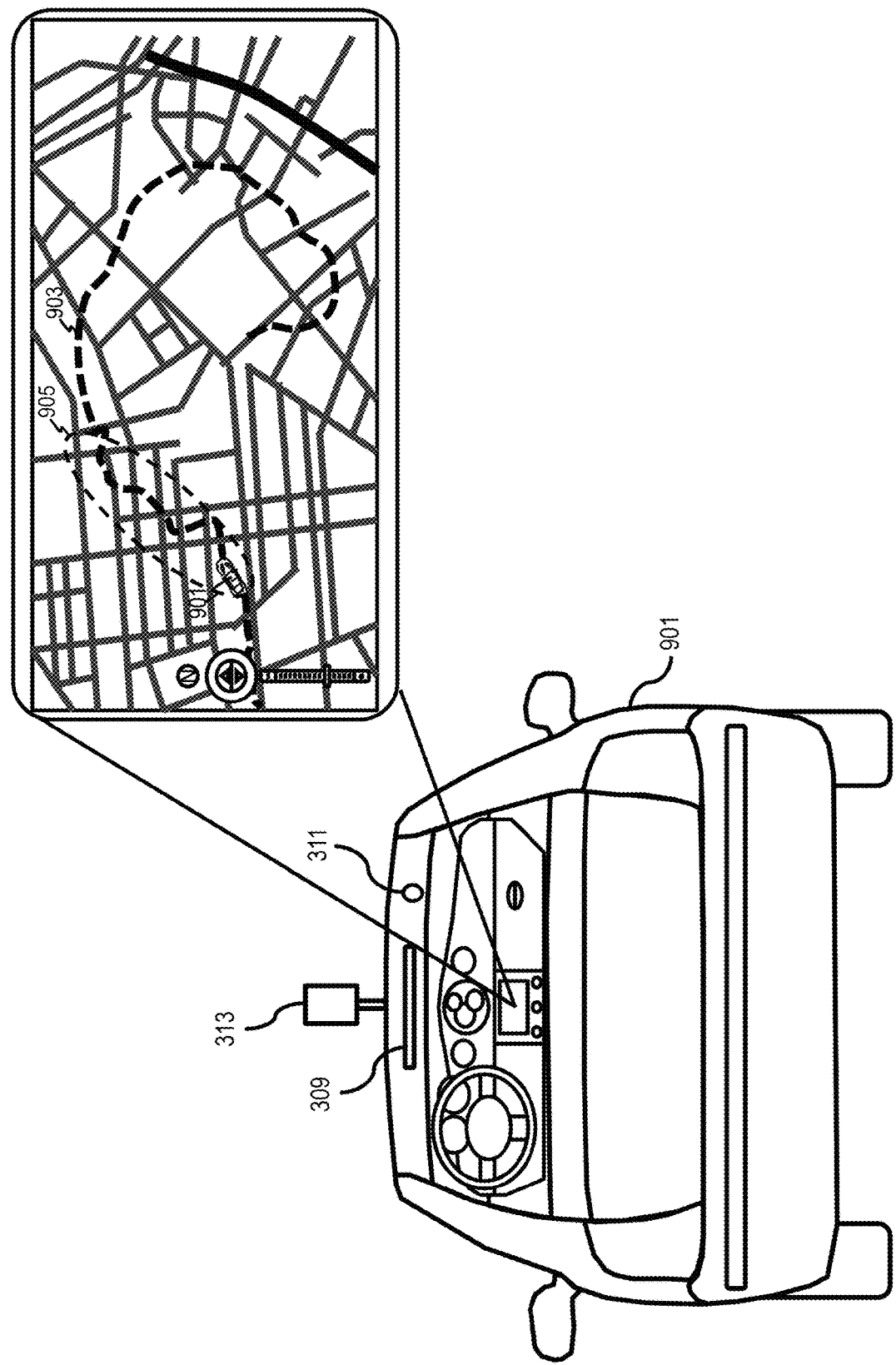
FIG. 9 is a diagram that represents a scenario wherein contextually relevant map data is retrieved based on terrain features, weather conditions and/or temporal information, according to one example embodiment.

FIG. 9 is a diagram that represents a scenario wherein contextually relevant map data is retrieved based on terrain features, weather conditions and/or temporal information, according to one example embodiment. In one embodiment, terrain features include open lands, tundra, desert, hills, mountains, forests, swamp, river, ocean, and so on. In another embodiment, weather conditions include rain, snow, fog, storm, and so on. In a further embodiment, the temporal information includes time of the day or night the query location needs to be analyzed. Thereafter, system 100 processes terrain features, weather conditions, and temporal information to determine a range of possible location-data points as relevant to the query. In one example embodiment, vehicle 901 is traversing a hilly road link 903 under a rainy night-time condition. System 100 filters out map data that falls outside the context specified by the semantics, e.g., road signs that are not visible at nighttime or during heavy rain. The filtered map data only includes information relevant to vehicle 901 and is within restricted search range 905, e.g., lane markings to prevent lane departures during rain, road signs to alert vehicle 901 of steep curves or accident-prone areas, and so on.

Figure 10:
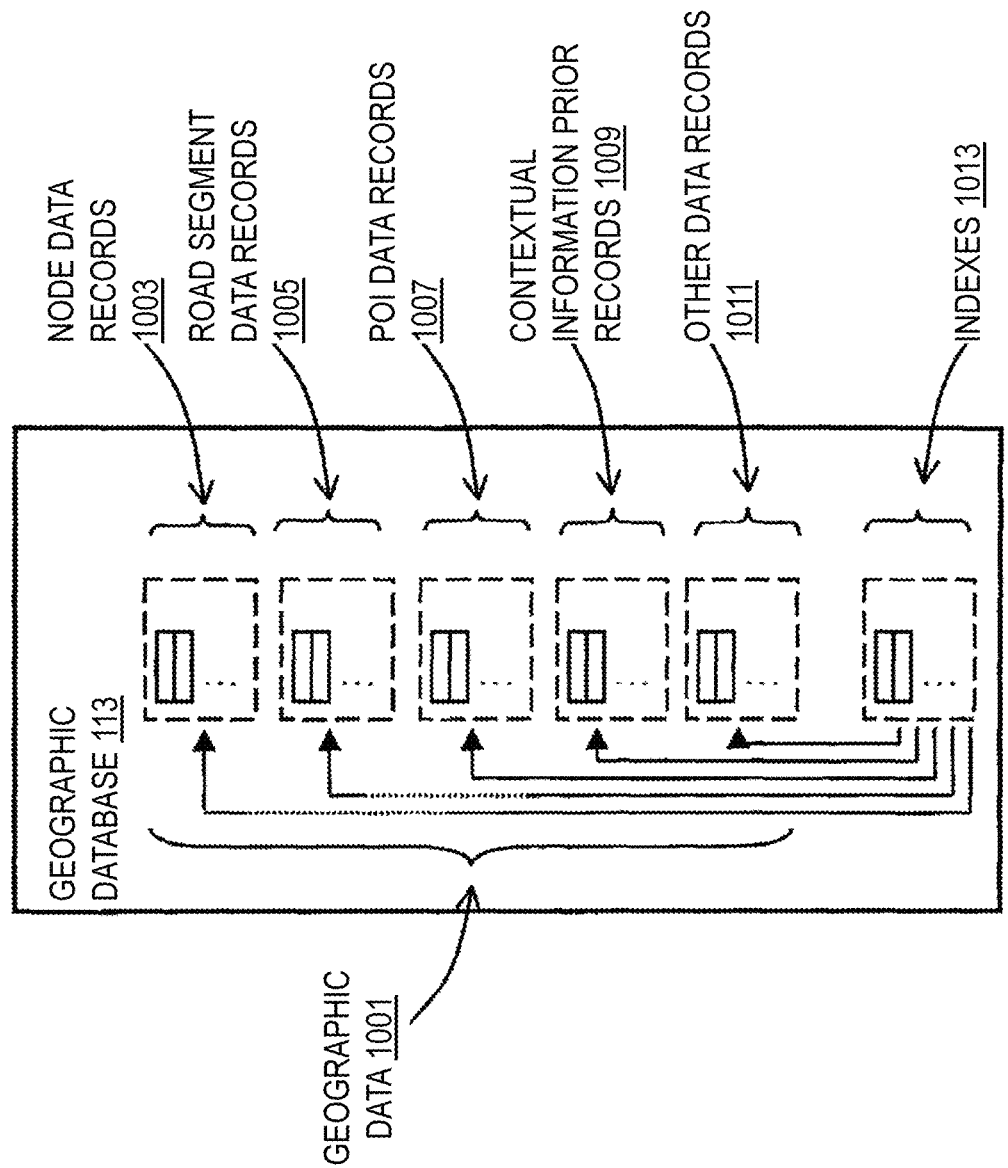
FIG. 10 is a diagram of a geographic database, according to one embodiment.

FIG. 10 is a diagram of a geographic database, according to one embodiment. In one embodiment, geographic database 113 includes geographic data 1001 used for (or configured to be compiled to be used for) mapping and/or navigation-related services. In one embodiment, geographic features, e.g., two-dimensional or three-dimensional features, are represented using polygons, e.g., two-dimensional features, or polygon extrusions, e.g., three-dimensional features. For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, geographic database 113 includes high resolution or high definition (HD) mapping data that provide centimeter-level or better accuracy of map features. For example, geographic database 113 can be based on Light Detection and Ranging (LiDAR) or equivalent technology to collect billions of 3D points and model road surfaces, structures, buildings, terrain, and other map features down to the number lanes and their widths. In one embodiment, the HD mapping data capture and store details such as the slope and curvature of the road, parking spots, lane markings, roadside objects such as signposts, including what the signage denotes, etc. By way of example, the HD mapping data enable highly automated vehicles to precisely localize themselves on the road, and to determine road attributes (e.g., learned speed limit values) to at high accuracy levels.

In one embodiment, the following terminology applies to the representation of geographic features in geographic database 113.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non-reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary, e.g., a hole or island. In one embodiment, a polygon is constructed from one outer simple polygon and none or at least one inner simple polygon. A polygon is simple if it just consists of one simple polygon, or complex if it has at least one inner simple polygon.

In one embodiment, geographic database 113 follows certain conventions. For example, links do not cross themselves and do not cross each other except at a node. Also, there are no duplicated shape points, nodes, or links. Two links that connect each other have a common node. In geographic database 113, overlapping geographic features are represented by overlapping polygons. When polygons overlap, the boundary of one polygon crosses the boundary of the other polygon. In geographic database 113, the location at which the boundary of one polygon intersects the boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, geographic database 113 includes node data records 1003, road segment or link data records 1005, POI data records 1007, contextual information prior records 1009, other records 1011, and indexes 1013, for example. More, fewer or different data records can be provided. In one embodiment, additional data records (not shown for illustrative convenience) can include cartographic ("carto") data records, routing data, and maneuver data. In one embodiment, indexes 1013 may improve the speed of data retrieval operations in geographic database 113. In one embodiment, indexes 1013 may be used to quickly locate data without having to search every row in geographic database 113 every time it is accessed. For example, in one embodiment, indexes 1013 can be a spatial index of the polygon points associated with stored feature polygons.

In exemplary embodiments, road segment data records 1005 are links or segments representing roads, streets, or paths, as can be used in the calculated route or recorded route information for determination of one or more personalized routes. Node data records 1003 are endpoints corresponding to respective links or segments of road segment data records 1005. Road link data records 1005 and node data records 1003 represent a road network, such as used by vehicles, cars, and/or other entities. Alternatively, geographic database 113 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation-related attributes, as well as POIs, such as gasoline stations, hotels, restaurants, museums, stadiums, offices, automobile dealerships, auto repair shops, buildings, stores, parks, etc. Geographic database 113 can include data about the POIs and their respective locations in POI data records 1007. Geographic database 113 can also include data about places, such as cities, towns, or other communities, and other geographic features, such as bodies of water, mountain ranges, etc. Such place or feature data can be part of POI data records 1007 or can be associated with POIs or POI data records 1007 (such as a data point used for displaying or representing a position of a city).

In one embodiment, geographic database 113 can also include contextual information prior records 1009 for storing contextually relevant map data and/or related data. The contextually relevant map data, for instance, can be stored as attributes or data records of a sensor data layer or overlay of geographic database 113, which fuses with the predicted attributes with map attributes or features. In one embodiment, contextual information prior records 1009 can be associated with segments of a road link or an entire link. In one embodiment, the segments can further subdivide the links of geographic database 113 into smaller segments to predict contextually relevant map data at a level of granularity at which the actual road or road network is represented in the geographic database 113. In one embodiment, contextual information prior records 1009 can be associated with one or more of node records 1003, road segment records 1005, and/or POI data records 1007; or portions thereof, e.g., smaller or different segments than indicated in road segment records 1005, to provide greater localization accuracy/speed. In this way, the retrieved contextually relevant map data stored in contextual information prior records 1009 can also be associated with the characteristics or metadata of the corresponding record 1003, 1005, and/or 1007.

In one embodiment, geographic database 113 can be maintained by content provider 129 in association with services platform 125 (e.g., a map developer). The map developer can collect geographic data to generate and enhance geographic database 113. There can be different ways used by the map developer to collect data. These ways can include obtaining data from other sources, such as municipalities or respective geographic authorities. In addition, the map developer can employ field personnel to travel by vehicle along roads throughout the geographic region to observe features (e.g., physical dividers, OPPO, VRU, etc.) and/or record information about them, for example. Also, remote sensing, such as aerial or satellite photography, can be used.

Geographic database 113 can be a master geographic database stored in a format that facilitates updating, maintenance, and development. For example, the master geographic database or data in the master geographic database can be in an Oracle spatial format or other spatial formats, such as for development or production purposes. The Oracle spatial format or development/production database can be compiled into a delivery format, such as geographic data files (GDF) format. The data in the production and/or delivery formats can be compiled or further compiled to form geographic database products or databases, which can be used in end-user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by vehicle 101, for example. The navigation-related functions can correspond to vehicle navigation, pedestrian navigation, or other types of navigation. The compilation to produce the end-user databases can be performed by a party or entity separate from the map developer. For example, a customer of the map developer, such as a navigation device developer or other end-user device developer, can perform compilation on a received geographic database in a delivery format to produce one or more compiled navigation databases.

The processes described herein for storing and retrieving map data using contextual information priors may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 11:
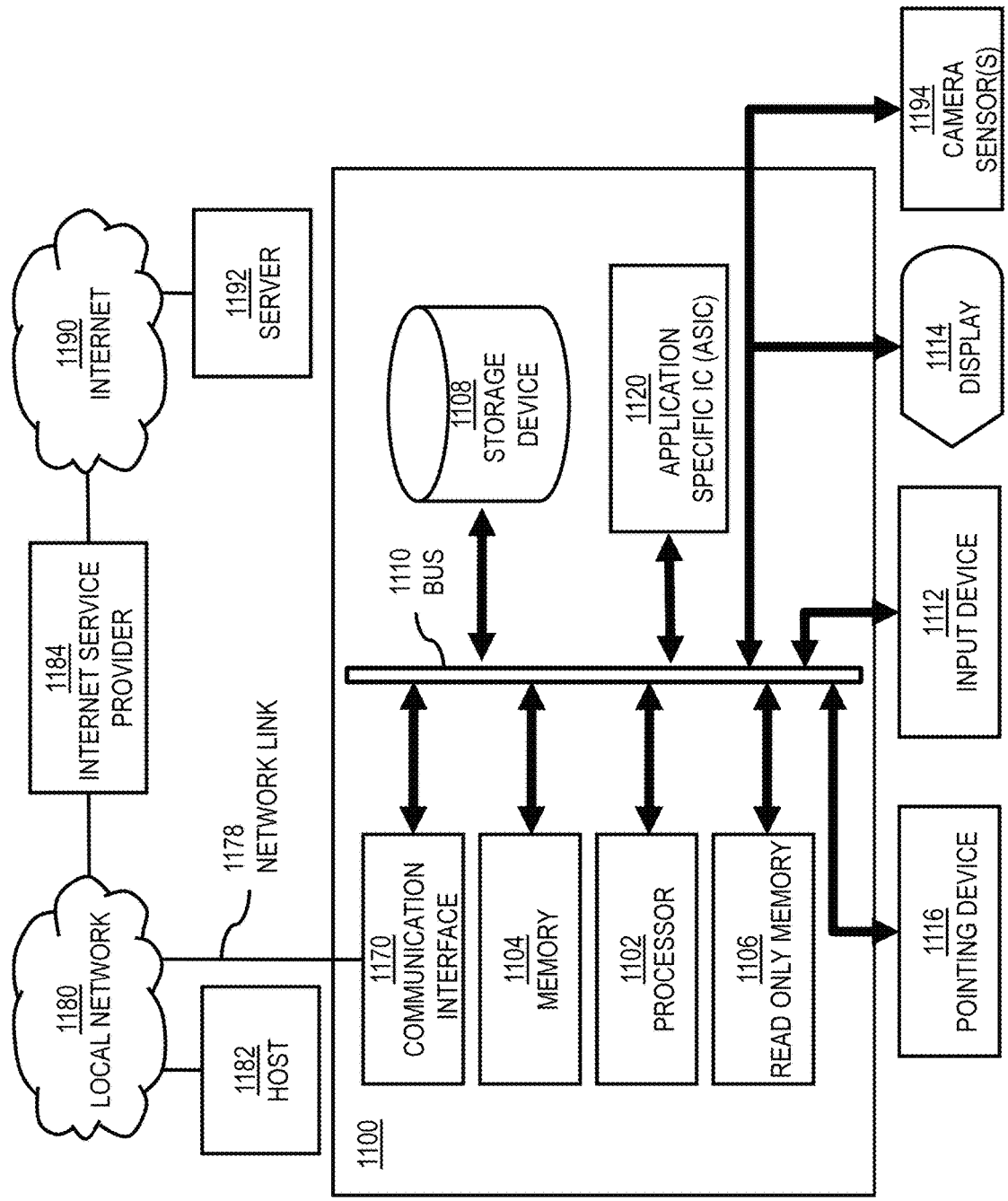
FIG. 11 illustrates a computer system 1100 upon which an embodiment of the invention may be implemented.

FIG. 11 illustrates a computer system 1100 upon which an embodiment of the invention may be implemented. Computer system 1100 is programmed (e.g., via computer program code or instructions) to store and retrieve map data using contextual information priors as described herein and includes a communication mechanism such as a bus 1110 for passing information between other internal and external components of computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1110 includes one or more parallel conductors of information so that information is transferred quickly among devices coupled to bus 1110. One or more processors 1102 for processing information are coupled with bus 1110.

A processor 1102 performs a set of operations on information as specified by computer program code related to store and retrieve map data using contextual information priors. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from bus 1110 and placing information on bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. Memory 1104, such as a random access memory (RAM) or other dynamic storage device, stores information including processor instructions for storing and retrieving map data using contextual information priors. Dynamic memory allows information stored therein to be changed by computer system 1100. RAM allows a unit of information stored at a location called a memory address to be stored and retrieved independently of information at neighboring addresses. Memory 1104 is also used by processor 1102 to store temporary values during execution of processor instructions. Computer system 1100 also includes a read only memory (ROM) 1106 or other static storage device coupled to bus 1110 for storing static information, including instructions, that is not changed by computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when computer system 1100 is turned off or otherwise loses power.

Information, including instructions for storing and retrieving map data using contextual information priors, is provided to bus 1110 for use by the processor from an external input device 1112, such as a keyboard containing alphanumeric keys operated by a human user, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT) or a liquid crystal display (LCD), or plasma screen or printer for presenting text or images, and a pointing device 1116, such as a mouse or a trackball or cursor direction keys, or motion sensor, for controlling a position of a small cursor image presented on display 1114 and issuing commands associated with graphical elements presented on display 1114. In some embodiments, for example, in embodiments in which computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of application specific ICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general, the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, communications interface 1170 sends or receives or both sends and receives electrical, acoustic or electromagnetic signals, including infrared and optical signals, that carry information streams, such as digital data. For example, in wireless handheld devices, such as mobile telephones like cell phones, communications interface 1170 includes a radio band electromagnetic transmitter and receiver called a radio transceiver. In certain embodiments, communications interface 1170 enables connection to communication network 123 for storing and retrieving map data using contextual information priors.

The term computer-readable medium is used herein to refer to any medium that participates in providing information to processor 1102, including instructions for execution. Such a medium may take many forms, including, but not limited to, non-volatile media, volatile media and transmission media. Non-volatile media include, for example, optical or magnetic disks, such as storage device 1108. Volatile media include, for example, dynamic memory 1104. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 12 illustrates a chip set 1200 upon which an embodiment of the invention may be implemented. Chip set 1200 is programmed to store and retrieve map data using contextual information priors as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, chip set 1200 includes a communication mechanism such as a bus 1201 for passing information among the components of chip set 1200. A processor 1203 has connectivity to bus 1201 to execute instructions and process information stored in, for example, a memory 1205. Processor 1203 may include one or more processing cores with each core configured to perform independently. A multi-core processor enables multiprocessing within a single physical package. Examples of a multi-core processor include two, four, eight, or greater numbers of processing cores. Alternatively or in addition, processor 1203 may include one or more microprocessors configured in tandem via bus 1201 to enable independent execution of instructions, pipelining, and multithreading. Processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process realworld signals (e.g., sound) in real time independently of processor 1203. Similarly, an ASIC 1209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

Processor 1203 and accompanying components have connectivity to memory 1205 via bus 1201. Memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to store and retrieve map data using contextual information priors. Memory 1205 also stores the data associated with or generated by the execution of the inventive steps.

Figure 13:
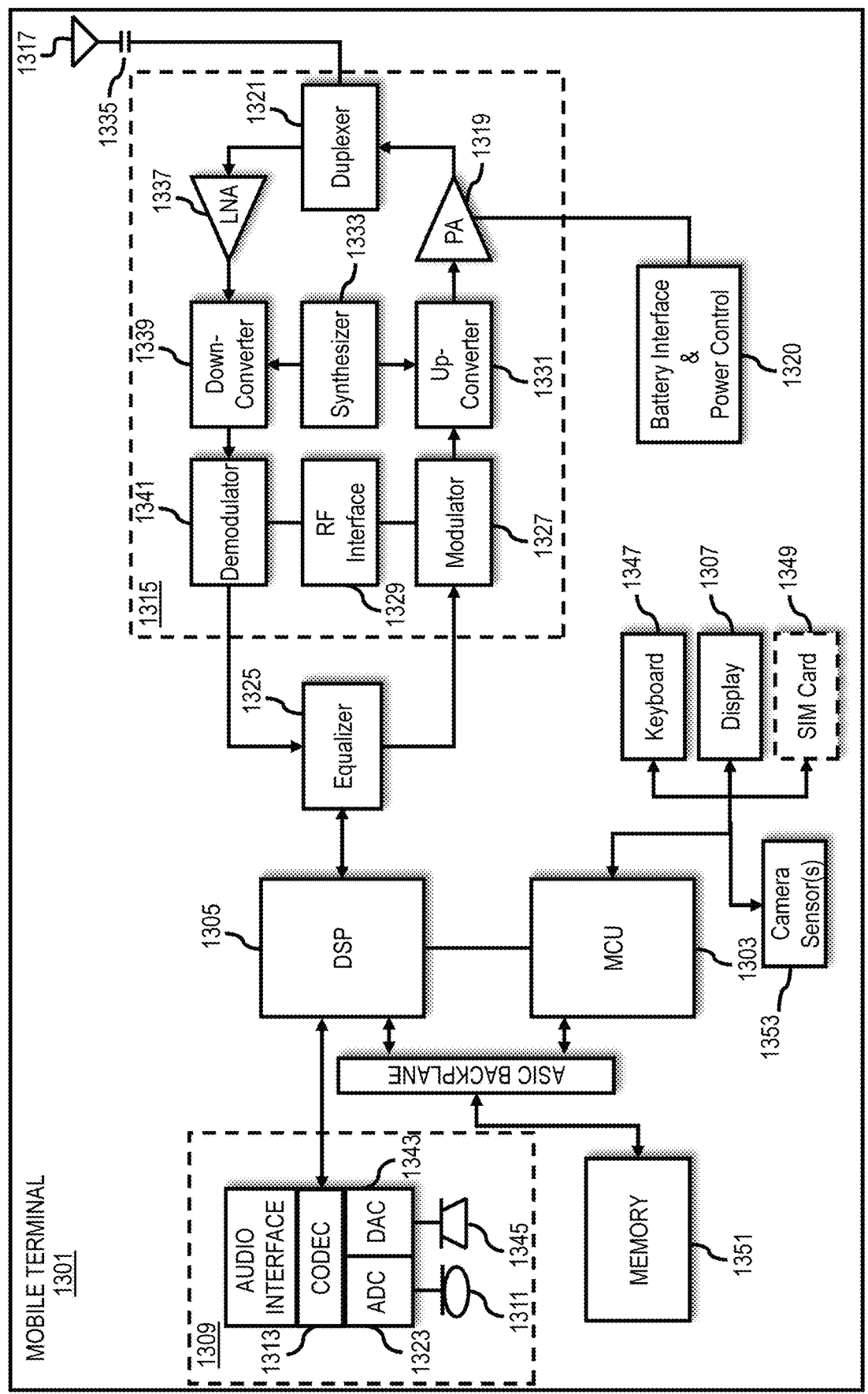
FIG. 13 is a diagram of exemplary components of a mobile terminal (e.g., handset) capable of operating in the system of FIG. 1, according to one embodiment.

FIG. 13 is a diagram of exemplary components of a mobile terminal (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile station functions that offer automatic contact matching. An audio function circuitry 1309 includes a microphone 1311 and microphone amplifier that amplifies the speech signal output from microphone 1311. The amplified speech signal output from microphone 1311 is fed to a coder/decoder (CODEC) 1313.

A radio section 1315 amplifies power and converts frequency in order to communicate with a base station, which is included in a mobile communication system, via antenna 1317. Power amplifier (PA) 1319 and the transmitter/modulation circuitry are operationally responsive to MCU 1303, with an output from PA 1319 coupled to duplexer 1321 or circulator or antenna switch, as known in the art. PA 1319 also couples to a battery interface and power control unit 1320.

In use, a user of mobile station 1301 speaks into microphone 1311 and his or her voice along with any detected background noise is converted into an analog voltage. The analog voltage is then converted into a digital signal through the Analog to Digital Converter (ADC) 1323. The control unit 1303 routes the digital signal into DSP 1305 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1325 for compensation of any frequency-dependent impairments that occur during transmission through the air such as phase and amplitude distortion. After equalizing the bit stream, modulator 1327 combines the signal with a RF signal generated in RF interface 1329. Modulator 1327 generates a sine wave by way of frequency or phase modulation. In order to prepare the signal for transmission, an up-converter 1331 combines the sine wave output from modulator 1327 with another sine wave generated by a synthesizer 1333 to achieve the desired frequency of transmission. The signal is then sent through a PA 1319 to increase the signal to an appropriate power level. In practical systems, PA 1319 acts as a variable gain amplifier whose gain is controlled by DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to mobile station 1301 are received via antenna 1317 and immediately amplified by a low noise amplifier (LNA) 1337. A down-converter 1339 lowers the carrier frequency while demodulator 1341 strips away the RF leaving only a digital bit stream. The signal then goes through equalizer 1325 and is processed by DSP 1305. A Digital to Analog Converter (DAC) 1343 converts the signal and the resulting output is transmitted to the user through speaker 1345, all under control of a Main Control Unit (MCU) 1303—which can be implemented as a Central Processing Unit (CPU) (not shown).

MCU 1303 receives various signals including input signals from the keyboard 1347. Keyboard 1347 and/or MCU 1303 in combination with other user input components (e.g., microphone 1311) comprise a user interface circuitry for managing user input. MCU 1303 runs a user interface software to facilitate user control of at least some functions of mobile station 1301 to store and retrieve map data using contextual information priors. MCU 1303 also delivers a display command and a switch command to display 1307 and to the speech output switching controller, respectively. Further, MCU 1303 exchanges information with DSP 1305 and can access an optionally incorporated SIM card 1349 and a memory 1351. In addition, MCU 1303 executes various control functions required of the station. DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile station 1301.

The CODEC 1313 includes ADC 1323 and DAC 1343. Memory 1351 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, memory device 1351 may be, but not limited to, a single memory, CD, DVD, ROM, RAM, EEPROM, optical storage, or any other non-volatile or non-transitory storage medium capable of storing digital data.

An optionally incorporated SIM card 1349 carries, for instance, important information, such as the cellular phone number, the carrier supplying service, subscription details, and security information. SIM card 1349 serves primarily to identify the mobile station 1301 on a radio network. Card 1349 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although the features of the invention are expressed in certain combinations among the claims, it is contemplated that these features can be arranged in any combination and order.

What is claimed is:

1. A computer-implemented method for use in training a plurality of neural networks for map data retrieval, the method comprising:
    processing contextual information to determine a restricted range of location information relevant to at least one query;
    processing sensor data received from at least one sensor, the sensor data collected at at least one query location, to determine semantic information;
    filtering the map data based, at least in part, on the restricted range of location information relevant to the at least one query, the semantic information, or a combination thereof; and
    retrieving only the filtered map data from a geographic database in response to the at least one query.

2. The method of claim 1, further comprising:
    processing vehicle position and/or heading data received from the at least one sensor to determine a geometric context for a driving direction of at least one vehicle; and
    filtering the map data based, at least in part, on the geometric context for a driving direction of the at least one vehicle.

3. The method of claim 2, further comprising:
    determining the semantic information by performing semantic segmentation of the sensor data to identify and segment one or more relevant regions in the sensor data.

4. The method of claim 3, further comprising:
    determining the geometric context for a driving direction of the at least one vehicle based, at least in part, on the semantic segmentation.

5. The method of claim 1, wherein the plurality of neural networks regresses the at least one query location on a mapping platform to separate unfiltered and filtered map data.

6. The method of claim 1, wherein the semantic information comprises one or more road signs, one or more lane lines, terrain features, drivable surfaces, or a combination thereof relevant to the at least one query location.

7. The method of claim 1, wherein the sensor data comprises visual data, aural data, light detection and ranging (LIDAR) data, or a combination thereof at least one query location.

8. The method of claim 1, wherein the contextual information comprises sensor information, temporal information, vehicle position information, seasonal information, temperature information, or a combination thereof.

9. The method of claim 1, wherein a neural network is used to process the contextual information to determine the restricted range of location information.

10. The method of claim 9, wherein the neural network is trained using the training data set comprising the filtered map data.

11. An apparatus for in training a plurality of neural networks for map data retrieval, comprising:
    at least one processor; and
    at least one memory including computer program code for one or more programs,
    the computer program code executed by the at least one processor, cause the apparatus to perform at least the following,
    process contextual information to determine a restricted range of location information relevant to at least one query;
    process sensor data received from at least one sensor, the sensor data collected at at least one query location, to determine semantic information;
    filter the map data based, at least in part, on the restricted range of location information relevant to the at least one query, the semantic information, or a combination thereof; and
    retrieve only the filtered map data from a geographic database in response to the at least one query.

12. The apparatus of claim 11, wherein the apparatus is further caused to:
    process vehicle position and/or heading data received from the at least one sensor to determine a geometric context for a driving direction of at least one vehicle; and
    filter the map data based, at least in part, on the geometric context for a driving direction of the at least one vehicle.

13. The apparatus of claim 12, further comprising:
    determine the semantic information by performing semantic segmentation of the sensor data to identify and segment one or more relevant regions in the sensor data.

14. The apparatus of claim 13, wherein the apparatus is further caused to:
    determine the geometric context for a driving direction of the at least one vehicle based, at least in part, on the semantic segmentation.

15. The apparatus of claim 11, wherein the plurality of neural networks regresses the at least one query location on a mapping platform to separate unfiltered and filtered map data.

16. The apparatus of claim 11, wherein the semantic information comprises one or more road signs, one or more lane lines, terrain features, drivable surfaces, or a combination thereof relevant to the at least one query location.

17. The apparatus of claim 11, wherein the sensor data comprises visual data, aural data, light detection and ranging (LIDAR) data, or a combination thereof at least one query location.

18. A non-transitory computer-readable storage medium for training a plurality of neural networks for map data retrieval, carrying one or more sequences of one or more instructions which, when executed by one or more processors, cause an apparatus to at least perform the following steps:
    processing contextual information to determine a restricted range of location information relevant to at least one query;
    processing sensor data received from at least one sensor, the sensor data collected at at least one query location, to determine semantic information;

filtering the map data based, at least in part, on the restricted range of location information relevant to the at least one query location, the semantic information, or a combination thereof; and retrieving only the filtered map data from a geographic database in response to the at least one query.

19. The non-transitory computer-readable storage medium of claim 18, further comprising:

processing vehicle position and/or heading data received from the at least one sensor to determine a geometric context for a driving direction of at least one vehicle; and filtering the map data based, at least in part, on the geometric context for a driving direction of the at least one vehicle.

20. The non-transitory computer-readable storage medium of claim 19, further comprising:

determining the semantic information by performing semantic segmentation of the sensor data to identify and segment one or more relevant regions in the sensor data.

* * * * *